Oct. 31, 1944.   G. D. JONES   2,361,633
THRESHER BARS FOR HARVESTING MACHINES
Filed Jan. 9, 1941

INVENTOR
George Douglas Jones
BY
ATTORNEY

Patented Oct. 31, 1944

2,361,633

UNITED STATES PATENT OFFICE 2,361,633

THRESHER BARS FOR HARVESTING MACHINES

George Douglas Jones, Shaker Heights, Ohio

Application January 9, 1941, Serial No. 373,811

7 Claims. (Cl. 130—27)

This invention relates to threshing bars for harvesting machines and, more particularly, to the flail bars mounted on threshing machine cylinders and the bottom bars mounted on the concave of the threshing chamber.

In modern combine harvesting machines, the method of threshing has been greatly improved over the old type threshers which used a large number of spaced apart teeth secured to a cylinder, and having a plurality of teeth secured to a concave member of the machine and located in the cylinder chamber.

In present day combine harvesters, longitudinal bars, termed flail bars, replace the teeth on the cylinder of the older units. The flail bars are secured to a plurality of spaced apart discs mounted on a horizontal shaft and forming a "cylinder." The term "concave bars" is applied to those bars carried by the concave of the threshing chamber which is mounted below the "cylinder."

The adjustment of the concave bars in relation to the flail bars is most important, as these bars do the work of threshing, separating the grain from the heads and other seeds from the pods and the straw.

Where metal bars are used, such as the rasp type cylinder and rasp type concave bar, difficulty is encountered in threshing to prevent cracking or splitting of the crop. However, where rubber is used on the flail bar and concave bar, cracking and splitting is reduced to a minimum, but the present forms of rubber covered bars are very short lived and often replacements are made every day or two which are costly, and require time, which is also expensive.

In use, the cylinder flail bars and the concave bars are subjected to considerable abrasive action by reason of dust and gritty materials brought into the threshing machine from the field, and consequently the bars rapidly wear out. Also due to the speed of the cylinder which must be maintained for efficient threshing, coupled with the abrasive material, rapid wear of the bar surfaces occurs.

It has been proposed to face the metal bars with various other materials, and while this is some improvement, the material is subjected to the wearing mentioned above and must be replaced from time to time. Unless new bars are at hand, much time is lost, and furthermore, the substitution of new bars is quite expensive. Again, such breakdowns generally occur in the field where replacements are not readily available, causing delay which at times may lose the crop.

Another detrimental factor of the prior faced bars which have been proposed, is that the facings become detached from the metal backing bars and even where the facing is rubber vulcanized or riveted to the backing bars, the rubber faces become loose in a comparatively short time. This is due mainly to the fact that the rubber facing is not provided with an overhanging portion on the bar to aid in retaining it to the bar.

These prior constructions have generally consisted of an angle iron with the outer vertical surface thereof faced with a flat strip of rubber, and as far as is known, it has never been proposed to use more than one rubber face on each bar.

The salient feature of the present invention is to provide cylinder and concave threshing bars with more than one work surface so that in the field it is a comparatively simple matter to readjust the bars when one surface has become worn, to rapidly present a new work face. In this way the time element and expense is cut to a minimum and additional bars do not have to be carried into the field.

Another object of the present invention is to form the threshing bars of a tubular box-like or other form of supporting member, and slip over these members a continuous resilient sheath which will permit the members to be successively turned to present a plurality of rubber or other resilient material work surfaces, or to turn the resilient covering on the member to present a plurality of work surfaces.

Figure 1:
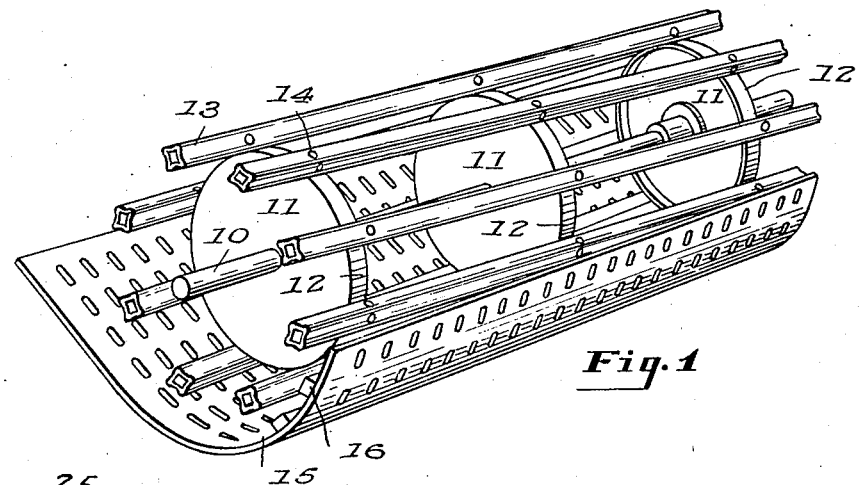
Fig. 1 is a perspective view of a threshing cylinder with its associated concave grate and bars.

Referring to Fig. 1, it is to be understood that this figure illustrates a conventional flail type "cylinder" and combination "concave and grate" assembly of the type now used on many threshing machines. The cylinder comprises an axle 10 on which are mounted a plurality of spaced apart discs 11, having flanged peripheries 12 with a suitable number of flail bars 13 secured thereto by bolts 14, defining a cylindrical structure. The type of flail bars shown are the form of the bars illustrated in Fig. 2.

A concave grid 15 of conventional design forms the lower portion of the cylinder chamber; the grid being provided with bars 16 placed across the concave portion of the grid and rigidly secured thereto.

As before stated, while it is not customary to use similar bars on the cylinder and concave, it is to be understood that threshing bars embodying the present invention and having a plurality of work surfaces may be used on either the cylinder or concave, or in combination with bars of previous construction.

Because the construction of both the cylinders and concave bars is similar, for clearness of illustration the detail drawing shows the threshing bars for use on the cylinder, as disclosed in Figs. 2 to 9 inclusive.

Figure 2:
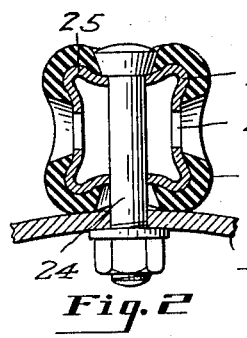
Fig. 2 is a vertical section of a cylinder bar of box-like construction with its fastening means.

In Fig. 2 there is shown a hollow box-like longitudinal flail bar 21 secured by a plurality of bolts 24 passing through the flanged edges 12 of the cylinder discs 11. The elongated box-like structure 21 is inserted within a resilient sheathing 22 having a plurality of oppositely aligned openings 23 therein for the reception of the bolts 24. As shown, the openings in the opposite walls of the box member 21 are depressed or turned inwardly at 25 to form a seat for the head of the bolts, and it will be obvious that the bolts may be removed from one set of openings and after the bar has been turned, a quarter, one-half or three-quarters, the bolts may be reinserted to present a new work face for the bar. It will also be evident that depending on the arrangement of the bolts holding the bar against the cylinder, that a plurality of work surfaces may be presented, as in use the majority of the wear occurs from the middle of the face upwardly around the slightly protruding upper corner where the resilient material is thickest.

Figure 3:
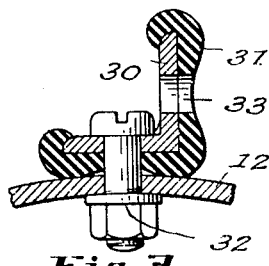
Fig. 3 is a vertical section of an angle iron type of cylinder bar showing the double work surfaces.

In Fig. 3 a simple angle iron 30 is used having a resilient covering 31 on its entire outer face. It should be noted that the resilient material overlaps a small portion of the inside of ends of the angle iron 30, thus providing an extended wearing surface and securing means for the resilient material. The bar is secured to the cylinder flanges 12, by bolts 32 passing through openings 33 extending through the arms of the angle iron and the resilient covering. When the leading face of the bar becomes worn, the bolts 32 are removed from one set of openings and the bar reversed and bolted through the other set of openings.

Figure 4:
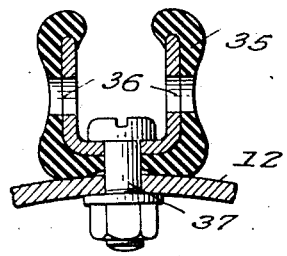
Fig. 4 is a U shaped cylinder bar arranged to have three work faces.

Fig. 4 is very similar to Fig. 3 with the exception that the inner bar is of U shaped formation which is covered on its three sides by a resilient layer of material 35. A plurality of bolt openings 36 are provided in each wall for the reception of bolts 37.

Figure 5:
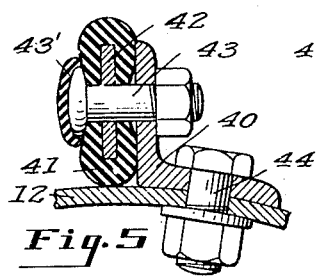
Fig. 5 is a form of cylinder bar utilizing a compressed tube drawn against an angle iron.

Fig. 5 illustrates a further modified form wherein an angle iron 40 has a resilient tube 41 tightly pressed against its outer face. A strip 42 is preferably placed within the tube 41 to permit the bolts 43 to draw the tube tightly against the face of the bar. As the heads of the bolts 43 are in the plane of the working face of the bar the heads are capped with rubber surfaces 43'.

As shown, a second bolt 44 is used for securing the bottom arm of the bar to flange 12 of the cylinder disc 11, and it will be obvious that when wear occurs the bolts 43 may be loosened and the resilient member 41 turned around or inverted so that four work surfaces or faces are available.

Figure 6:
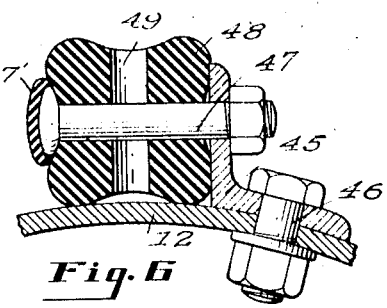
Fig. 6 is a vertical section of a solid rubber block drawn against the face of an angle iron and provided with diametrically opposed openings to provide securing means therefore.

Fig. 6 also uses a simple angle iron 45 with a holding bolt 46 and resilient block holding bolt 47 similar to the construction of Fig. 5. In this form, however, a solid resilient block 48 is used and provided with transverse openings 49 therein to permit the block to be reversed or inverted, and thereby present additional work faces to the material operated upon. The head of the holding bolt 47 is covered with a resilient coating 47'.

Figure 7:
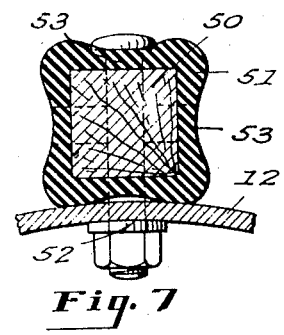
Fig. 7 is a solid bar composed of wood or resin and covered with a sheath of resilient material having a plurality of work surfaces.

Fig. 7 is one form of a solid bar 50 which may be composed of some resinous material such as Bakelite, or hard wood such as hickory. The resilient sheathing 51 fits about the core 50 and is secured to the flanges 12 of the cylinder discs 11 by bolts 52 positioned in the passages 53. It is to be understood that passages are provided in both directions through for the removal of the bars from the cylinder discs and are then repositioned in the manner set forth above.

Figure 8:
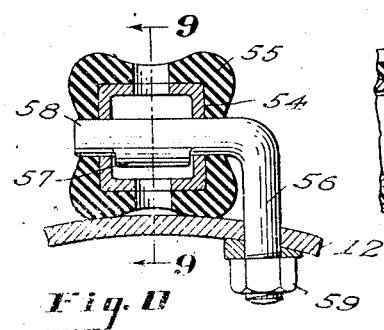
Fig. 8 is a modified form of continuous resilient work faces positioned over a hollow box, together with a novel form of fastening for securing the assembly to the cylinder or concave.
Figure 9:
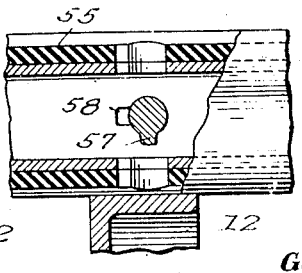
Fig. 9 is a section taken on line 9—9 of Fig. 8.

In Figs. 8 and 9 there is shown a hollow tubular member 54 over which is placed a continuous resilient tube or sheath 55. This type of bar is secured to the cylinder or concave by angle bolts 56 having offset lugs 57 formed on the horizontal portions thereof. As illustrated, the bolts may be turned and the lugs inserted with the openings 58 formed in the tubular members 54 and through the resilient material and thereafter turned at right angles whereby the offset portions 57 lock the bolts in place. The angle bolts 56 are secured to the flange 12 by means of nuts 59. Of course passages are provided in both directions for the removal of the bars, and they may be repositioned in the manner set forth above.

While the face of the bars or the sheathing encompassing the bars may be of any suitable resilient material, it has been found that crude rubber latex tubes or sheets have proved very satisfactory, as have also the new types of synthetic rubbers now available. On the other hand, mechanical rubber may be used with considerable satisfaction. In practice the facings or tubings may be affixed to their respective bars or tubes by vulcanization, cementation, electrodeposition or the like, or the tubings may be extruded and slipped over the members. Another manner of covering the inner cores or centers is to pass them through an extruding die and simultaneously deposit the resilient material thereon.

It will be observed from the drawing that the portions of the facings normally lying away from the cylinder discs 11 are progressively thicker than the mid-sections. This formation is not critical to the operation of the present invention but the additional thickness at this point where the greatest abrasion takes place materially lengthens the life of the particular work face.

The cross sectional form of the preferred resilient or rubber facing is undulated in a vertical plane although as above stated, the shape is not critical as a straight face may be used.

The term multilateral as used, defines a flail bar and/or concave bar having a plurality of work faces or sides.

It will be understood that various forms of the invention other than those described above may be used without departing from the spirit or scope of the invention.

What I claim is:

1. Threshing bars for harvesting machines comprising elongated members that are square in cross section, resilient tubes covering over said members, said tubes having enlarged bulbous portions formed therein whereby an arcuate thickened wear surface is presented at the corners of said members, and means for securing said covered members against a base support in any one of a plurality of positions.

2. A multilateral flail bar for the cylinder of a harvesting machine, a plurality of holes in said bar, a resilient covering completely covering the bar, a plurality of holes in the said resilient covering and registering with the holes in the bar, the said covering being of undulated form with enlarged bulbous portions formed therein adjacent the edges of the bar and securing means associated with the holes for securing the bar to supporting parts of the cylinder.

3. A flail bar for harvester threshers comprising an angle bar and a substantially square mass of resilient material secured thereto, said mass being provided with a plurality of concave work-surfaces having rounded edges and securing means for the said angle bar.

4. A multilateral flail bar for the cylinder of a harvesting machine, means for securing the bar to supporting parts of the cylinder, adjustable resilient wearing surfaces having concave faces and bulbous edges secured to the bar, the said wearing surfaces forming a unitary member extending over the outer edge of the bar and adapted to be turned on said bar to present different work faces.

5. A flail bar comprising an inner core or center, said core having concave faces and rounded corners, a continuous resilient sheath therefore, said sheath being rotatable on said inner core or center.

6. In a thresher, a cylinder, a plurality of threshing means extending generally longitudinally of the cylinder, each threshing means comprising a member having one portion secured to the cylinder and another portion extending radially outwardly from the cylinder, a resilient beating element extending radially outwardly along the leading face of the radial portion and being thicker at its inner and outer edges than at its mid-section, and means detachably securing the resilient beating element to the radial portion for permitting reversal of the beating element to make the inner edge thereof serve as the beating edge at the outer end of the radial portion after wearing of the outer edge of the resilient beating element, both the inner and outer edges and the intermediate portion of the beating element being exposed to crops in the original position of the beating element and in the reversed position.

7. In a thresher, a cylinder, a plurality of threshing means extending generally longitudinally of the cylinder, each threshing means comprising a member having one portion secured to the cylinder and another portion extending radially outwardly from the cylinder, a plate extending radially outwardly along the leading face of the radial portion, a rubber covering bonded to the plate and being thicker at its inner and outer edges than at a mid-section, bolts secured to the plate and extending through the radial portion of the member, nuts threaded to the bolts for holding the plate and rubber covering removably secured to the radial portion of the member, whereby the plate and rubber covering may be reversed to place the inner edge of the rubber covering at the outer end of the radial portion of the member to serve as the beating edge after wearing of the outer edge of the resilient beating element, both the inner and outer edges and the intermediate portion of the beating element being exposed to crops in the original position of the beating element and in the reversed position.

GEORGE DOUGLAS JONES.